United States Patent
Perdomo (10) Patent No.: US 9,992,021 B1
(45) Date of Patent: Jun. 5, 2018

(54) SYSTEM AND METHOD FOR PRIVATE AND POINT-TO-POINT COMMUNICATION BETWEEN COMPUTING DEVICES

(71) Applicant: goTenna Inc., Brooklyn, NY (US)

(72) Inventor: Jorge Perdomo, New York, NY (US)

(73) Assignee: GoTenna, Inc., Brooklyn, NY (US)

( * ) Notice: Subject to any disclaimer, the term of this patent is extended or adjusted under 35 U.S.C. 154(b) by 415 days.

(21) Appl. No.: 14/210,841

(22) Filed: Mar. 14, 2014

Related U.S. Application Data (60) Provisional application No. 61/784,354, filed on Mar. 14, 2013.

(51) Int. Cl.
   *H04L 9/00* (2006.01)
   *H04L 9/14* (2006.01)

(52) U.S. Cl.
   CPC ............ *H04L 9/14* (2013.01); *H04L 2209/24* (2013.01)

(58) Field of Classification Search
   CPC ........................... H04L 63/0492; H04L 63/18
   USPC .......................................................... 713/171
   See application file for complete search history.

(56) References Cited

U.S. PATENT DOCUMENTS

| | | |
|---|---|---|
| 5,347,272 A | 9/1994 | Ota |
| 5,412,654 A | 5/1995 | Perkins |
| 5,835,861 A | 11/1998 | Whiteside |
| 5,903,726 A | 5/1999 | Donovan et al. |
| 5,920,826 A | 7/1999 | Metso et al. |
| 5,987,504 A | 11/1999 | Toga |
| 6,015,344 A | 1/2000 | Kelly et al. |
| 6,020,810 A | 2/2000 | Har-Even |
| 6,119,976 A | 9/2000 | Rogers |
| 6,195,751 B1 | 2/2001 | Caronni et al. |
| 6,205,330 B1 | 3/2001 | Winbladh |
| 6,225,901 B1 | 5/2001 | Kail, IV |
| 6,292,669 B1 | 9/2001 | Meuronen et al. |
| 6,304,556 B1 | 10/2001 | Haas |
| 6,321,257 B1 | 11/2001 | Kotola et al. |
| 6,356,761 B1 | 3/2002 | Huttunen et al. |
| 6,397,058 B1 | 5/2002 | Thibert et al. |

(Continued)

FOREIGN PATENT DOCUMENTS

| | | |
|---|---|---|
| CN | 102932216 | 2/2013 |
| CN | 203490861 | 3/2014 |

(Continued)

OTHER PUBLICATIONS

LAN/MAN standards Committee. "Part 11: Wireless lan medium access control (mac) and physical layer (phy) specifications." IEEE-SA Standards Board (2003).

(Continued)

*Primary Examiner* — Yin-Chen Shaw
*Assistant Examiner* — Michael Guirguis
(74) *Attorney, Agent, or Firm* — Steven M. Hoffberg; Tully Rinckey PLLC (57) ABSTRACT

A hardware and software bundle that can enable computers and mobile phones to communicate small data packages without relying on the internet or the central cellular network infrastructure. The bundle enables users to send text messages and other data. For example, GPS coordinates, multimedia from the situation, accelerometer and other sensor data can all be sent over a decentralized network, enabling enhanced communication and situation response when the central grid is unavailable.

19 Claims, 3 Drawing Sheets

(56) References Cited

U.S. PATENT DOCUMENTS

| | | |
|---|---|---|
| 6,401,027 B1 | 6/2002 | Xu et al. |
| 6,415,158 B1 | 7/2002 | King et al. |
| 6,424,638 B1 | 7/2002 | Ray et al. |
| 6,424,828 B1 | 7/2002 | Collins et al. |
| 6,430,407 B1 | 8/2002 | Turtiainen |
| 6,487,602 B1 | 11/2002 | Thakker |
| 6,560,456 B1 | 5/2003 | Lohtia et al. |
| 6,564,261 B1 | 5/2003 | Gudjonsson et al. |
| 6,587,693 B1 | 7/2003 | Lumme et al. |
| 6,628,620 B1 | 9/2003 | Cain |
| 6,647,426 B2 | 11/2003 | Mohammed |
| 6,664,891 B2 | 12/2003 | Davies et al. |
| 6,763,004 B1 | 7/2004 | De Oliveira |
| 6,781,971 B1 | 8/2004 | Davis et al. |
| 6,796,582 B2 | 9/2004 | Scholz |
| 6,801,781 B1 | 10/2004 | Provost et al. |
| 6,807,165 B2 | 10/2004 | Belcea |
| 6,816,460 B1 | 11/2004 | Ahmed et al. |
| 6,832,093 B1 | 12/2004 | Ranta |
| 6,839,339 B1 | 1/2005 | Chuah |
| 6,865,191 B1 | 3/2005 | Bengtsson et al. |
| 6,870,846 B2 | 3/2005 | Cain |
| 6,879,574 B2 | 4/2005 | Naghian et al. |
| 6,879,807 B2 | 4/2005 | Fox et al. |
| 6,904,029 B2 | 6/2005 | Fors et al. |
| 6,909,706 B2 | 6/2005 | Wilmer et al. |
| 6,912,389 B2 | 6/2005 | Bright et al. |
| 6,937,602 B2 | 8/2005 | Whitehill et al. |
| 6,940,832 B2 | 9/2005 | Saadawi et al. |
| 6,947,738 B2 | 9/2005 | Skog et al. |
| 6,954,435 B2 | 10/2005 | Billhartz et al. |
| 6,957,077 B2 | 10/2005 | Dehlin |
| 6,958,986 B2 | 10/2005 | Cain |
| 6,970,417 B1 | 11/2005 | Doverspike et al. |
| 6,990,352 B2 | 1/2006 | Pyhalammi et al. |
| 6,993,049 B2 | 1/2006 | Davies |
| 6,999,573 B2 | 2/2006 | Weaver |
| 7,027,409 B2 | 4/2006 | Cain |
| 7,027,822 B1 | 4/2006 | Hwang et al. |
| 7,031,280 B2 | 4/2006 | Segal |
| 7,068,622 B2 | 6/2006 | Jagadeesan et al. |
| 7,076,251 B2 | 7/2006 | Jagadeesan et al. |
| 7,089,006 B2 | 8/2006 | Idnani et al. |
| 7,113,801 B2 | 9/2006 | Back et al. |
| 7,113,803 B2 | 9/2006 | Dehlin |
| 7,127,250 B2 | 10/2006 | Gallagher et al. |
| 7,133,684 B2 | 11/2006 | Farley et al. |
| 7,152,110 B2 | 12/2006 | Pierce |
| 7,155,526 B2 | 12/2006 | Chaudhary et al. |
| 7,158,798 B2 | 1/2007 | Lee et al. |
| 7,162,236 B2 | 1/2007 | Dorenbosch et al. |
| 7,179,166 B1 | 2/2007 | Abbott |
| 7,184,421 B1 | 2/2007 | Liu et al. |
| 7,184,757 B2 | 2/2007 | Mendiola et al. |
| 7,187,923 B2 | 3/2007 | Mousseau et al. |
| 7,190,956 B2 | 3/2007 | Dorenbosch et al. |
| 7,197,326 B2 | 3/2007 | Acampora |
| 7,206,574 B2 | 4/2007 | Bright et al. |
| 7,206,594 B2 | 4/2007 | Shostak |
| 7,227,853 B2 | 6/2007 | Jagadeesan et al. |
| 7,227,937 B1 | 6/2007 | Yoakum et al. |
| 7,233,589 B2 | 6/2007 | Tanigawa et al. |
| 7,236,472 B2 | 6/2007 | Lazaridis et al. |
| 7,251,238 B2 | 7/2007 | Joshi et al. |
| 7,266,085 B2 | 9/2007 | Stine |
| 7,272,387 B2 | 9/2007 | Hsu et al. |
| 7,295,521 B2 | 11/2007 | Choi et al. |
| 7,299,286 B2 | 11/2007 | Ramsayer et al. |
| 7,307,978 B2 | 12/2007 | Carlson |
| 7,308,273 B2 | 12/2007 | Zhang |
| 7,310,659 B1 | 12/2007 | George |
| 7,315,742 B2 | 1/2008 | Creamer et al. |
| 7,315,747 B2 | 1/2008 | Klassen et al. |
| 7,319,882 B2 | 1/2008 | Mendiola et al. |
| 7,321,767 B2 | 1/2008 | Mizutani et al. |
| 7,330,694 B2 | 2/2008 | Lee et al. |
| 7,340,523 B2 | 3/2008 | Van Dyke et al. |
| 7,342,503 B1 | 3/2008 | Light et al. |
| 7,342,895 B2 | 3/2008 | Serpa et al. |
| 7,346,167 B2 | 3/2008 | Billhartz et al. |
| 7,359,731 B2 | 4/2008 | Choksi |
| 7,379,732 B2 | 5/2008 | Bells et al. |
| 7,379,753 B2 | 5/2008 | Hara et al. |
| 7,383,046 B2 | 6/2008 | Jagadeesan et al. |
| 7,391,331 B1 | 6/2008 | Light et al. |
| 7,394,388 B1 | 7/2008 | Light et al. |
| 7,394,795 B2 | 7/2008 | Chitrapu et al. |
| 7,395,055 B2 | 7/2008 | Chitrapu et al. |
| 7,395,078 B2 | 7/2008 | Roth |
| 7,400,903 B2 | 7/2008 | Shoemake et al. |
| 7,403,838 B2 | 7/2008 | Deen et al. |
| 7,414,992 B2 | 8/2008 | Hirsbrunner et al. |
| 7,428,580 B2 | 9/2008 | Hullfish et al. |
| 7,450,540 B2 | 11/2008 | Gronberg et al. |
| 7,453,864 B2 | 11/2008 | Kennedy et al. |
| 7,466,226 B1 | 12/2008 | Light et al. |
| 7,466,991 B2 | 12/2008 | Everson et al. |
| 7,471,655 B2 | 12/2008 | Gallagher et al. |
| 7,475,240 B2 | 1/2009 | Shah et al. |
| 7,477,908 B2 | 1/2009 | Klassen et al. |
| 7,480,733 B2 | 1/2009 | Cernohous et al. |
| 7,480,870 B2 | 1/2009 | Anzures et al. |
| 7,483,701 B2 | 1/2009 | Jagadeesan et al. |
| 7,489,902 B2 | 2/2009 | Amani et al. |
| 7,502,335 B2 | 3/2009 | Lin |
| 7,505,446 B2 | 3/2009 | Pecen |
| 7,508,822 B2 | 3/2009 | Tanigawa et al. |
| 7,509,136 B2 | 3/2009 | Hart et al. |
| 7,512,094 B1 | 3/2009 | Linebarger et al. |
| 7,515,934 B2 | 4/2009 | Iizuka et al. |
| 7,519,073 B2 | 4/2009 | Caspi et al. |
| 7,519,359 B2 | 4/2009 | Chiarulli et al. |
| 7,522,058 B1 | 4/2009 | Light et al. |
| 7,525,933 B1 | 4/2009 | Hall |
| 7,525,975 B2 | 4/2009 | Caspi et al. |
| 7,526,310 B2 | 4/2009 | Billmaier et al. |
| 7,528,729 B2 | 5/2009 | Light et al. |
| 7,529,557 B2 | 5/2009 | Farrill |
| 7,536,708 B2 | 5/2009 | Caspi et al. |
| 7,539,492 B2 | 5/2009 | Jagadeesan et al. |
| 7,542,455 B2 | 6/2009 | Grayson et al. |
| 7,543,030 B2 | 6/2009 | Hsieh et al. |
| 7,546,119 B2 | 6/2009 | Ham |
| 7,552,236 B2 | 6/2009 | Greenfield et al. |
| 7,567,547 B2 | 7/2009 | Mosko et al. |
| 7,567,816 B2 | 7/2009 | Hasegawa |
| 7,573,833 B2 | 8/2009 | Pirzada et al. |
| 7,573,842 B2 | 8/2009 | Xie et al. |
| 7,587,482 B2 | 9/2009 | Henderson et al. |
| 7,590,589 B2 | 9/2009 | Hoffberg |
| 7,590,696 B1 | 9/2009 | Odell et al. |
| 7,599,685 B2 | 10/2009 | Goldberg et al. |
| 7,602,738 B2 | 10/2009 | Preguica |
| 7,602,748 B2 | 10/2009 | Sinnreich et al. |
| 7,606,190 B2 | 10/2009 | Markovic et al. |
| 7,607,096 B2 | 10/2009 | Oreizy et al. |
| 7,609,167 B1 | 10/2009 | Light et al. |
| 7,609,669 B2 | 10/2009 | Sweeney et al. |
| 7,613,467 B2 | 11/2009 | Fleischman |
| 7,616,961 B2 | 11/2009 | Billhartz |
| 7,620,685 B2 | 11/2009 | Marcjan |
| 7,626,967 B2 | 12/2009 | Yarvis et al. |
| 7,634,281 B2 | 12/2009 | Kalavade |
| 7,640,293 B2 | 12/2009 | Wilson et al. |
| 7,640,309 B2 | 12/2009 | Li et al. |
| 7,643,833 B2 | 1/2010 | Sankisa |
| 7,647,022 B2 | 1/2010 | Ng et al. |
| 7,650,143 B2 | 1/2010 | Jagadeesan et al. |
| 7,653,715 B2 | 1/2010 | Bobde et al. |
| 7,656,851 B1 | 2/2010 | Ghanadan et al. |
| 7,657,224 B2 | 2/2010 | Goldberg et al. |
| 7,664,490 B2 | 2/2010 | Aaby et al. |
| 7,672,255 B2 | 3/2010 | Lin |
| 7,676,583 B2 | 3/2010 | Eaton et al. |

(56) References Cited

U.S. PATENT DOCUMENTS

| | | | |
|---|---|---|---|
| 7,684,787 B2 | 3/2010 | Qu et al. |
| 7,689,238 B2 | 3/2010 | Biswas et al. |
| 7,697,459 B2 | 4/2010 | Conner et al. |
| 7,698,307 B2 | 4/2010 | Oreizy et al. |
| 7,702,340 B2 | 4/2010 | Pournasseh et al. |
| 7,702,346 B2 | 4/2010 | Choksi |
| 7,711,810 B2 | 5/2010 | McKinnon et al. |
| 7,729,344 B2 | 6/2010 | Schessel |
| 7,729,346 B2 | 6/2010 | Lee et al. |
| 7,730,236 B2 | 6/2010 | Hu et al. |
| 7,733,232 B2 | 6/2010 | Light et al. |
| 7,738,861 B2 | 6/2010 | Fournier |
| 7,738,896 B2 | 6/2010 | Patel et al. |
| 7,742,399 B2 | 6/2010 | Pun |
| 7,742,740 B2 | 6/2010 | Goldberg et al. |
| 7,742,768 B2 | 6/2010 | Liu et al. |
| 7,751,432 B2 | 7/2010 | Martin et al. |
| 7,751,842 B2 | 7/2010 | Sung et al. |
| 7,760,671 B2 | 7/2010 | Ruuska et al. |
| 7,764,637 B2 | 7/2010 | Lin |
| 7,769,017 B2 | 8/2010 | Sylvain |
| 7,773,550 B2 | 8/2010 | Lin |
| 7,782,890 B2 | 8/2010 | Herberger et al. |
| 7,787,749 B2 | 8/2010 | Caspi et al. |
| 7,792,050 B2 | 9/2010 | Metke et al. |
| 7,792,150 B2 | 9/2010 | Chen et al. |
| 7,792,542 B2 | 9/2010 | Yau et al. |
| 7,800,507 B2 | 9/2010 | Light et al. |
| 7,805,142 B2 | 9/2010 | Calin et al. |
| 7,805,532 B2 | 9/2010 | Pattison et al. |
| 7,813,326 B1 | 10/2010 | Kelm et al. |
| 7,813,730 B1 | 10/2010 | Patel et al. |
| 7,814,322 B2 | 10/2010 | Gurevich et al. |
| 7,817,606 B2 | 10/2010 | Lin |
| 7,818,565 B2 | 10/2010 | Miller et al. |
| 7,822,810 B2 | 10/2010 | Dayal et al. |
| 7,826,868 B2 | 11/2010 | Robbins et al. |
| 7,830,864 B2 | 11/2010 | Li |
| 7,835,346 B2 | 11/2010 | He et al. |
| 7,835,347 B2 | 11/2010 | Guo |
| 7,835,689 B2 | 11/2010 | Goldberg et al. |
| 7,835,759 B2 | 11/2010 | Bells et al. |
| 7,835,761 B2 | 11/2010 | Gill et al. |
| 7,839,826 B2 | 11/2010 | Promenzio et al. |
| 7,839,841 B2 | 11/2010 | Baek et al. |
| 7,844,287 B2 | 11/2010 | Bengtsson et al. |
| 7,859,560 B1 | 12/2010 | Issa |
| 7,860,060 B2 | 12/2010 | Promenzio et al. |
| 7,864,168 B2 | 1/2011 | French |
| 7,865,137 B2 | 1/2011 | Goldberg et al. |
| 7,870,211 B2 | 1/2011 | Pascal et al. |
| 7,873,735 B2 | 1/2011 | Jain et al. |
| 7,873,758 B2 | 1/2011 | Hu et al. |
| 7,882,265 B2 | 2/2011 | Miller et al. |
| 7,886,075 B2 | 2/2011 | Molteni et al. |
| 7,890,112 B2 | 2/2011 | Ito et al. |
| 7,899,487 B2 | 3/2011 | Oh |
| 7,904,103 B2 | 3/2011 | Sung et al. |
| 7,911,987 B2 | 3/2011 | Lazaridis et al. |
| 7,916,877 B2 | 3/2011 | Goldberg et al. |
| 7,917,082 B2 | 3/2011 | Goldberg et al. |
| 7,917,169 B1 | 3/2011 | Hall |
| 7,920,065 B2 | 4/2011 | Light et al. |
| 7,924,796 B2 | 4/2011 | Vu Duong et al. |
| 7,933,293 B2 | 4/2011 | Wentink |
| 7,945,634 B1 | 5/2011 | Huda |
| 7,948,951 B2 | 5/2011 | Wentink |
| 7,953,371 B2 | 5/2011 | Lee et al. |
| 7,961,663 B2 | 6/2011 | Lin |
| 7,962,556 B2 | 6/2011 | Wiles |
| 7,966,111 B2 | 6/2011 | Moinzadeh et al. |
| 7,969,914 B1 | 6/2011 | Gerber et al. |
| 7,969,925 B2 | 6/2011 | Lin |
| 7,970,421 B2 | 6/2011 | Murphy et al. |
| 7,970,436 B1 | 6/2011 | Katzer et al. |
| 7,970,749 B2 | 6/2011 | Uhlir et al. |
| 7,970,849 B2 | 6/2011 | Klassen et al. |
| 7,971,060 B2 | 6/2011 | Shah et al. |
| 7,974,270 B2 | 7/2011 | Goel et al. |
| 7,974,402 B2 | 7/2011 | Pun |
| 7,974,625 B2 | 7/2011 | Baumann et al. |
| 7,986,665 B2 | 7/2011 | Kezys et al. |
| 7,996,002 B2 | 8/2011 | Sweeney et al. |
| 7,996,558 B2 | 8/2011 | Hsu et al. |
| 8,000,313 B1 | 8/2011 | Shah et al. |
| 8,000,325 B2 | 8/2011 | Ravikumar et al. |
| 8,000,710 B2 | 8/2011 | Jagadeesan et al. |
| 8,001,181 B2 | 8/2011 | Wilson et al. |
| 8,001,249 B2 | 8/2011 | Murphy et al. |
| 8,005,058 B2 | 8/2011 | Pecen |
| 8,005,070 B2 | 8/2011 | Marsh et al. |
| 8,005,494 B2 | 8/2011 | Florkey et al. |
| 8,009,615 B2 | 8/2011 | Krishnakumar et al. |
| 8,010,112 B1 | 8/2011 | Delker et al. |
| 8,014,329 B2 | 9/2011 | Gong |
| 8,019,279 B2 | 9/2011 | Bauchot et al. |
| 8,023,663 B2 | 9/2011 | Goldberg |
| 8,028,024 B2 | 9/2011 | Krishnan |
| 8,031,720 B2 | 10/2011 | Yagyu et al. |
| 8,032,453 B2 | 10/2011 | Ahuja et al. |
| 8,036,692 B2 | 10/2011 | Ayyasamy et al. |
| 8,041,312 B2 | 10/2011 | Endo |
| 8,041,373 B2 | 10/2011 | Bengtsson et al. |
| 8,041,377 B2 | 10/2011 | Itaya et al. |
| 8,045,542 B2 | 10/2011 | Lappalainen |
| 8,045,568 B2 | 10/2011 | Sylvain et al. |
| 8,046,721 B2 | 10/2011 | Chaudhri et al. |
| 8,050,196 B2 | 11/2011 | Yoon |
| 8,050,360 B2 | 11/2011 | Wentink |
| 8,050,695 B2 | 11/2011 | Bells et al. |
| 8,050,817 B2 | 11/2011 | Moinzadeh et al. |
| 8,059,578 B2 | 11/2011 | Rudnick |
| 8,059,601 B2 | 11/2011 | Choi et al. |
| 8,060,568 B2 | 11/2011 | Cohen et al. |
| 8,064,355 B2 | 11/2011 | Klassen et al. |
| 8,078,153 B2 | 12/2011 | Pattison et al. |
| 8,085,758 B2 | 12/2011 | Ramachandran et al. |
| 8,085,813 B2 | 12/2011 | Melick et al. |
| 8,086,223 B2 | 12/2011 | Allen |
| RE43,127 E | 1/2012 | Wentink |
| 8,090,401 B2 | 1/2012 | Soto |
| 8,094,594 B2 | 1/2012 | Lazaridis et al. |
| 8,095,175 B2 | 1/2012 | Todd et al. |
| 8,103,215 B2 | 1/2012 | Rek |
| 8,112,082 B2 | 2/2012 | Nylander et al. |
| 8,116,686 B2 | 2/2012 | Lin et al. |
| 8,121,262 B1 | 2/2012 | Michaelis |
| 8,121,629 B2 | 2/2012 | Davis et al. |
| 8,126,473 B1 | 2/2012 | Kim et al. |
| 8,128,405 B2 | 3/2012 | Preston et al. |
| 8,130,718 B2 | 3/2012 | Shaheen |
| 8,131,605 B2 | 3/2012 | Donnelli et al. |
| 8,135,426 B2 | 3/2012 | Bertino et al. |
| 8,139,554 B1 * | 3/2012 | Simon ............... H04W 40/12 370/349 |
| 8,144,619 B2 | 3/2012 | Hoffberg |
| 8,145,262 B2 | 3/2012 | Martinez et al. |
| 8,145,566 B1 | 3/2012 | Ahuja et al. |
| 8,145,719 B2 | 3/2012 | Barman et al. |
| 8,150,416 B2 | 4/2012 | Ribaudo et al. |
| 8,150,437 B2 | 4/2012 | Choksi |
| 8,150,922 B2 | 4/2012 | Griffin et al. |
| 8,156,193 B1 | 4/2012 | Odell et al. |
| 8,159,456 B2 | 4/2012 | Kim et al. |
| 8,160,538 B2 | 4/2012 | Feder et al. |
| 8,163,198 B2 | 4/2012 | Saito et al. |
| 8,165,585 B2 | 4/2012 | Gallagher et al. |
| RE43,436 E | 5/2012 | Teven et al. |
| 8,170,547 B1 | 5/2012 | Bhan et al. |
| 8,171,432 B2 | 5/2012 | Matas et al. |
| 8,175,625 B2 | 5/2012 | Klassen et al. |
| 8,180,334 B2 | 5/2012 | Jagadeesan et al. |
| 8,180,399 B1 | 5/2012 | Katzer et al. |
| 8,185,101 B1 | 5/2012 | Wiseman et al. |

(56) References Cited

U.S. PATENT DOCUMENTS

| | | |
|---|---|---|
| 8,189,535 B2 | 5/2012 | Akselsen |
| 8,194,541 B2 | 6/2012 | Leppanen et al. |
| 8,194,577 B2 | 6/2012 | Xie et al. |
| 8,194,632 B2 | 6/2012 | Lin |
| 8,194,640 B2 | 6/2012 | Ramachandran et al. |
| 8,194,682 B2 | 6/2012 | Martinez et al. |
| 8,195,169 B1 | 6/2012 | Upadhyay et al. |
| 8,195,833 B2 | 6/2012 | Miller et al. |
| 8,200,782 B2 | 6/2012 | Pradhan et al. |
| 8,203,990 B2 | 6/2012 | Watanabe et al. |
| 8,204,543 B2 | 6/2012 | Keevill et al. |
| 8,204,938 B2 | 6/2012 | Digate et al. |
| 8,204,939 B2 | 6/2012 | Nielson et al. |
| 8,209,637 B2 | 6/2012 | Chaudhri et al. |
| 8,213,365 B2 | 7/2012 | Bienn et al. |
| 8,213,409 B2 | 7/2012 | Rudnick et al. |
| 8,213,936 B2 | 7/2012 | Huang et al. |
| 8,218,444 B2 | 7/2012 | Chaturvedi et al. |
| 8,223,710 B2 | 7/2012 | Ito |
| 8,233,924 B2 | 7/2012 | Sweeney et al. |
| 8,238,319 B2 | 8/2012 | Kadowaki et al. |
| 8,248,367 B1 | 8/2012 | Barney et al. |
| 8,248,916 B2 | 8/2012 | Baglin et al. |
| 8,248,947 B2 | 8/2012 | Li et al. |
| 8,249,078 B1 | 8/2012 | Hassan et al. |
| 8,249,590 B2 | 8/2012 | Govindarajan et al. |
| 8,254,265 B2 | 8/2012 | Ramachandran et al. |
| 8,254,546 B2 | 8/2012 | Gewecke |
| 8,254,910 B1 | 8/2012 | Breau et al. |
| 8,255,469 B2 | 8/2012 | Leppanen et al. |
| 8,265,038 B2 | 9/2012 | Kezys et al. |
| 8,265,589 B2 | 9/2012 | Heit et al. |
| 8,279,850 B2 | 10/2012 | Elias et al. |
| 8,279,868 B2 | 10/2012 | Martinez et al. |
| 8,280,344 B2 | 10/2012 | O'Reilly |
| 8,280,422 B2 | 10/2012 | Forsten et al. |
| 8,285,312 B2 | 10/2012 | Rybak |
| 8,286,103 B2 | 10/2012 | Chaudhri et al. |
| 8,301,713 B2 | 10/2012 | Klassen et al. |
| 8,302,033 B2 | 10/2012 | Matas et al. |
| 8,320,943 B2 | 11/2012 | Tysowski |
| 8,326,486 B2 | 12/2012 | Moinzadeh et al. |
| 8,327,024 B2 | 12/2012 | Pattison et al. |
| 8,327,272 B2 | 12/2012 | Anzures et al. |
| 8,331,962 B2 | 12/2012 | Chang |
| 8,332,544 B1 | 12/2012 | Ralls et al. |
| 8,334,998 B2 | 12/2012 | Shimizu |
| 8,335,164 B2 | 12/2012 | Liu |
| 8,335,207 B2 | 12/2012 | Singh et al. |
| 8,340,094 B2 | 12/2012 | Clack et al. |
| 8,340,649 B2 | 12/2012 | Ringland et al. |
| 8,341,271 B2 | 12/2012 | Cho et al. |
| 8,341,289 B2 | 12/2012 | Hellhake et al. |
| 8,345,601 B2 | 1/2013 | Lazaridis et al. |
| 8,346,677 B1 | 1/2013 | Markarian et al. |
| 8,346,678 B1 | 1/2013 | Markarian et al. |
| 8,351,896 B2 | 1/2013 | Purnadi et al. |
| 8,352,371 B2 | 1/2013 | Proctor |
| 8,352,563 B2 | 1/2013 | Chaturvedi et al. |
| 8,355,410 B2 | 1/2013 | Hall |
| 8,359,066 B2 | 1/2013 | Martinez et al. |
| 8,359,643 B2 | 1/2013 | Low et al. |
| 8,364,804 B2 | 1/2013 | Childress et al. |
| 8,369,298 B2 | 2/2013 | Lin |
| 8,369,829 B2 | 2/2013 | Nagubhai et al. |
| 8,369,879 B1 | 2/2013 | Upadhyay et al. |
| 8,370,432 B2 | 2/2013 | Digate et al. |
| 8,374,165 B2 | 2/2013 | Yang |
| 8,375,092 B2 | 2/2013 | Digate et al. |
| 8,376,857 B1 | 2/2013 | Shuman et al. |
| 8,380,160 B2 | 2/2013 | Monks et al. |
| 8,380,231 B2 | 2/2013 | Riddle et al. |
| 8,385,909 B1 | 2/2013 | Bhan et al. |
| 8,392,607 B2 | 3/2013 | Ishii et al. |
| 8,396,484 B2 | 3/2013 | Johnson et al. |
| 8,406,116 B2 | 3/2013 | Lin |
| 8,406,168 B2 | 3/2013 | Richeson et al. |
| 8,406,229 B2 | 3/2013 | Chaturvedi et al. |
| 8,407,314 B2 | 3/2013 | Chaturvedi et al. |
| 8,411,580 B2 | 4/2013 | Stille et al. |
| 8,416,083 B2 | 4/2013 | Light et al. |
| 8,416,274 B2 | 4/2013 | Chang et al. |
| 8,416,939 B1 | 4/2013 | Pino et al. |
| 8,417,287 B2 | 4/2013 | Soto |
| 8,427,957 B2 | 4/2013 | Matsushita et al. |
| 8,432,820 B2 | 4/2013 | Liu et al. |
| 8,432,893 B2 | 4/2013 | Chitrapu et al. |
| 8,432,917 B2 | 4/2013 | Chaturvedi et al. |
| 8,437,460 B2 | 5/2013 | Daniell et al. |
| 8,438,227 B2 | 5/2013 | Mo et al. |
| 8,441,994 B2 | 5/2013 | Ito |
| 8,446,883 B2 | 5/2013 | Curtin et al. |
| 8,446,933 B2 | 5/2013 | Wentink |
| 8,447,021 B2 | 5/2013 | Zourzouvillys et al. |
| 8,452,895 B2 | 5/2013 | Ito |
| 8,456,297 B2 | 6/2013 | van Os |
| 8,458,274 B2 | 6/2013 | Malik et al. |
| 8,462,750 B2 | 6/2013 | Sylvain |
| 8,463,305 B2 | 6/2013 | Klassen et al. |
| 8,464,182 B2 | 6/2013 | Blumenberg et al. |
| 8,467,387 B2 | 6/2013 | Chaturvedi et al. |
| 8,467,779 B2 | 6/2013 | Helfrich |
| 8,468,010 B2 | 6/2013 | Chaturvedi et al. |
| 8,472,989 B2 | 6/2013 | Klassen et al. |
| 8,478,261 B2 | 7/2013 | Vempati et al. |
| 8,478,277 B2 | 7/2013 | Jiang |
| 8,478,281 B2 | 7/2013 | Mooney |
| 8,483,192 B2 | 7/2013 | Chu et al. |
| 8,483,652 B2 | 7/2013 | Hall |
| 8,488,589 B2 | 7/2013 | Rudnick et al. |
| 8,495,199 B2 | 7/2013 | Miller et al. |
| 8,495,714 B2 | 7/2013 | Jones et al. |
| 8,498,660 B2 | 7/2013 | Lawler et al. |
| 8,503,355 B2 | 8/2013 | Pichelin et al. |
| 8,503,934 B2 | 8/2013 | Beghini et al. |
| 8,504,090 B2 | 8/2013 | Klein et al. |
| 8,504,715 B2 | 8/2013 | Mao et al. |
| 8,509,123 B2 | 8/2013 | Katis et al. |
| 8,509,186 B2 | 8/2013 | Oerton et al. |
| 8,509,731 B2 | 8/2013 | Kholaif et al. |
| 8,509,788 B2 | 8/2013 | Natarajan et al. |
| 8,527,644 B2 | 9/2013 | Crampton |
| 8,527,903 B2 | 9/2013 | Chaudhri et al. |
| 8,528,072 B2 | 9/2013 | Shi |
| 8,538,433 B2 | 9/2013 | Kekki et al. |
| 8,538,458 B2 | 9/2013 | Haney |
| 8,547,962 B2 | 10/2013 | Ramachandran et al. |
| 8,553,561 B1 * | 10/2013 | Chokshi ............ H04L 45/125 370/238 |
| 8,554,859 B2 | 10/2013 | Klassen et al. |
| 8,554,915 B2 | 10/2013 | Famolari et al. |
| 8,558,798 B2 | 10/2013 | Chen et al. |
| 8,559,947 B2 | 10/2013 | Nath et al. |
| 8,564,545 B2 | 10/2013 | Chen et al. |
| 8,565,145 B2 | 10/2013 | Khan et al. |
| 8,565,676 B2 | 10/2013 | Gormley et al. |
| 8,565,799 B2 | 10/2013 | Gupta et al. |
| 8,566,403 B2 | 10/2013 | Pascal et al. |
| 8,566,412 B2 | 10/2013 | Barman et al. |
| 8,570,939 B2 | 10/2013 | Dayal et al. |
| 8,576,831 B2 | 11/2013 | Zhang et al. |
| 8,576,993 B2 | 11/2013 | Salonen |
| 8,578,015 B2 | 11/2013 | Billhartz |
| 8,578,054 B2 | 11/2013 | Thubert et al. |
| 8,583,149 B2 | 11/2013 | Vyrros et al. |
| 8,584,050 B2 | 11/2013 | Ording et al. |
| 8,589,194 B2 | 11/2013 | Salonen |
| 8,600,006 B2 | 12/2013 | Constantinof et al. |
| 8,600,830 B2 | 12/2013 | Hoffberg |
| 8,605,867 B2 | 12/2013 | Malik |
| 8,606,306 B2 | 12/2013 | Santamaria et al. |
| 8,607,167 B2 | 12/2013 | Matas et al. |
| 8,607,317 B2 | 12/2013 | Lee et al. |
| 8,611,893 B2 | 12/2013 | Rosenberg et al. |

(56) References Cited

U.S. PATENT DOCUMENTS

| | | |
|---|---|---|
| 8,619,789 B2 | 12/2013 | Hui et al. |
| 8,620,362 B2 | 12/2013 | Goldman et al. |
| 8,627,237 B2 | 1/2014 | Chaudhri et al. |
| 8,630,177 B2 | 1/2014 | Vasseur et al. |
| 8,630,644 B2 | 1/2014 | Brueckheimer et al. |
| 8,631,078 B2 | 1/2014 | Wherry et al. |
| 8,634,522 B2 | 1/2014 | Salonen |
| 8,634,853 B2 | 1/2014 | Bogatin |
| 8,638,939 B1 | 1/2014 | Casey et al. |
| 8,639,277 B1 | 1/2014 | Upadhyay et al. |
| 8,640,057 B2 | 1/2014 | Chaudhri et al. |
| 8,644,486 B2 | 2/2014 | Gewecke |
| 8,649,314 B2 | 2/2014 | Lin |
| 8,649,368 B2 | 2/2014 | Daniell et al. |
| 8,654,698 B2 | 2/2014 | Koskela et al. |
| 8,654,782 B2 | 2/2014 | Meil et al. |
| 8,655,369 B2 | 2/2014 | Chen |
| 8,655,395 B2 | 2/2014 | Gaal et al. |
| 8,655,408 B2 | 2/2014 | Keevill et al. |
| 8,660,047 B2 | 2/2014 | Jerbi et al. |
| 8,660,139 B2 | 2/2014 | Ruckart |
| 8,660,610 B2 | 2/2014 | Keevill et al. |
| 8,661,081 B2 | 2/2014 | Rahnama et al. |
| 8,661,144 B2 | 2/2014 | Schultz et al. |
| 8,661,500 B2 | 2/2014 | Boldyrev et al. |
| 8,665,481 B2 | 3/2014 | Shimizu |
| 8,666,380 B2 | 3/2014 | Salonen |
| 8,670,760 B2 | 3/2014 | Lawler et al. |
| 8,675,831 B2 | 3/2014 | Cai et al. |
| 8,676,159 B1 | 3/2014 | Shu et al. |
| 8,676,165 B2 | 3/2014 | Cheng et al. |
| 8,676,189 B2 | 3/2014 | Lawler et al. |
| 8,676,262 B2 | 3/2014 | Keevill et al. |
| 8,676,265 B2 | 3/2014 | Keevill et al. |
| 8,676,899 B2 | 3/2014 | Ogle et al. |
| 8,682,309 B2 | 3/2014 | Helfrich |
| 8,687,600 B2 | 4/2014 | Lim |
| 8,688,081 B2 | 4/2014 | Klassen et al. |
| 8,688,141 B2 | 4/2014 | Ribaudo et al. |
| 8,688,152 B2 | 4/2014 | Lazaridis et al. |
| 8,688,822 B2 | 4/2014 | Maes |
| 8,693,434 B2 | 4/2014 | Sinnreich et al. |
| 8,694,008 B2 | 4/2014 | Bonner |
| 8,694,587 B2 | 4/2014 | Chaturvedi et al. |
| 8,694,923 B2 | 4/2014 | Chaudhri et al. |
| 8,695,030 B2 | 4/2014 | Runne |
| 8,699,456 B2 | 4/2014 | Smadi et al. |
| 8,700,072 B2 | 4/2014 | Pascal et al. |
| 8,700,075 B2 | 4/2014 | Riddle et al. |
| 8,704,863 B2 | 4/2014 | Santamaria et al. |
| 8,706,169 B2 | 4/2014 | Cortright |
| 8,712,931 B1 | 4/2014 | Wahlen |
| 8,718,014 B2 | 5/2014 | Choi et al. |
| 8,718,604 B2 | 5/2014 | Kim |
| 8,719,341 B2 | 5/2014 | Issa et al. |
| 8,719,359 B2 | 5/2014 | Barman et al. |
| 8,719,425 B2 | 5/2014 | Barman et al. |
| 8,723,647 B2 | 5/2014 | Koo et al. |
| 8,725,632 B2 | 5/2014 | Tompkins et al. |
| 8,725,880 B2 | 5/2014 | Santamaria et al. |
| 8,725,895 B2 | 5/2014 | Chaturvedi et al. |
| 8,730,948 B2 | 5/2014 | Le Rouzic et al. |
| 8,731,509 B2 | 5/2014 | Abdel-Kader et al. |
| 8,731,519 B2 | 5/2014 | Flynn et al. |
| 8,731,569 B2 | 5/2014 | Mooney |
| 8,736,488 B2 | 5/2014 | Sheynblat |
| 8,737,350 B2 | 5/2014 | Gupta |
| 8,737,353 B2 | 5/2014 | Gholmieh et al. |
| 8,737,954 B2 | 5/2014 | Salonen |
| 8,737,955 B2 | 5/2014 | Salonen |
| 8,737,958 B2 | 5/2014 | Salonen |
| 8,737,959 B2 | 5/2014 | Salonen |
| 8,738,061 B2 | 5/2014 | Klein et al. |
| 8,738,084 B2 | 5/2014 | Keevill et al. |
| 8,743,781 B2 | 6/2014 | Chaturvedi et al. |
| 8,744,419 B2 | 6/2014 | Hall et al. |
| 8,744,452 B2 | 6/2014 | Carter et al. |
| 8,745,149 B2 | 6/2014 | Klassen et al. |
| 8,745,544 B2 | 6/2014 | Chaudhri et al. |
| 8,750,245 B2 | 6/2014 | Bakthavathsalu et al. |
| 8,750,248 B2 | 6/2014 | Gupta et al. |
| 8,750,263 B2 | 6/2014 | Kezys et al. |
| 8,751,667 B2 | 6/2014 | Santamaria et al. |
| 8,755,371 B2 | 6/2014 | Ramachandran et al. |
| 8,761,101 B1 | 6/2014 | Crosbie et al. |
| 8,761,737 B2 | 6/2014 | Clarke et al. |
| 8,774,149 B2 | 7/2014 | Lin |
| 8,780,064 B2 | 7/2014 | Kim et al. |
| 8,782,766 B1 | 7/2014 | Metke et al. |
| 8,782,775 B2 | 7/2014 | Fadell et al. |
| 8,787,336 B1 | 7/2014 | Issa |
| 8,787,383 B2 | 7/2014 | Botha et al. |
| 8,788,949 B2 | 7/2014 | Hunt et al. |
| 8,794,513 B2 | 8/2014 | Wayne et al. |
| 8,799,516 B2 | 8/2014 | Libman |
| 8,799,820 B2 | 8/2014 | Pascal et al. |
| 8,804,573 B2 | 8/2014 | Maes |
| 8,804,653 B2 | 8/2014 | Svensson et al. |
| 8,806,205 B2 | 8/2014 | Metke et al. |
| 8,812,013 B2 | 8/2014 | Agarwal et al. |
| 8,812,681 B2 | 8/2014 | Kruglick |
| 8,825,108 B2 | 9/2014 | LaBauve et al. |
| 8,825,774 B2 | 9/2014 | Salonen |
| 8,831,647 B2 | 9/2014 | Digate et al. |
| 8,831,823 B2 | 9/2014 | Moinzadeh et al. |
| 8,831,824 B2 | 9/2014 | Moinzadeh et al. |
| 8,832,792 B2 | 9/2014 | Mikan |
| 8,837,689 B2 | 9/2014 | Salonen |
| 8,838,332 B2 | 9/2014 | Moinzadeh et al. |
| 8,843,854 B2 | 9/2014 | Oh et al. |
| 8,848,558 B1* | 9/2014 | Martin .................. H04L 41/12 370/252 |
| 2001/0005676 A1 | 6/2001 | Masuda et al. |
| 2002/0058504 A1 | 5/2002 | Stanforth |
| 2002/0137459 A1 | 9/2002 | Ebata et al. |
| 2002/0141454 A1 | 10/2002 | Muniere |
| 2002/0151307 A1 | 10/2002 | Demarez et al. |
| 2002/0155826 A1 | 10/2002 | Robinson et al. |
| 2002/0155846 A1 | 10/2002 | Shiraga |
| 2002/0163912 A1 | 11/2002 | Carlson |
| 2002/0165000 A1 | 11/2002 | Fok |
| 2002/0167960 A1 | 11/2002 | Garcia-Luna-Aceves |
| 2002/0184357 A1* | 12/2002 | Traversat et al. ............. 709/223 |
| 2003/0013467 A1 | 1/2003 | Caloud |
| 2003/0018726 A1 | 1/2003 | Low et al. |
| 2003/0050096 A1 | 3/2003 | Heatley |
| 2003/0074413 A1 | 4/2003 | Nielsen et al. |
| 2003/0126213 A1 | 7/2003 | Betzler |
| 2003/0163580 A1 | 8/2003 | Lee |
| 2003/0163697 A1* | 8/2003 | Pabla et al. ................... 713/171 |
| 2003/0193394 A1 | 10/2003 | Lamb |
| 2003/0235158 A1 | 12/2003 | Lee et al. |
| 2004/0032843 A1 | 2/2004 | Schaefer et al. |
| 2004/0066330 A1 | 4/2004 | Knockeart et al. |
| 2004/0157590 A1 | 8/2004 | Lazaridis et al. |
| 2004/0185881 A1 | 9/2004 | Lee et al. |
| 2004/0205134 A1 | 10/2004 | Digate et al. |
| 2004/0213270 A1 | 10/2004 | Su et al. |
| 2004/0230373 A1 | 11/2004 | Tzamaloukas |
| 2004/0266426 A1 | 12/2004 | Marsh et al. |
| 2005/0002407 A1 | 1/2005 | Shaheen et al. |
| 2005/0021645 A1 | 1/2005 | Kulkarni et al. |
| 2005/0041578 A1 | 2/2005 | Huotari et al. |
| 2005/0058094 A1 | 3/2005 | Lazaridis et al. |
| 2005/0058151 A1 | 3/2005 | Yeh |
| 2005/0096065 A1 | 5/2005 | Fleischman |
| 2005/0101342 A1 | 5/2005 | Chuang |
| 2005/0138359 A1* | 6/2005 | Simon .................. H04L 63/0823 713/156 |
| 2005/0141694 A1 | 6/2005 | Wengrovitz |
| 2005/0152318 A1 | 7/2005 | Elbatt et al. |
| 2005/0152378 A1 | 7/2005 | Bango et al. |
| 2005/0174972 A1* | 8/2005 | Boynton .................. H04L 47/10 370/337 |

(56) References Cited

U.S. PATENT DOCUMENTS

| | | |
|---|---|---|
| 2005/0202819 A1 | 9/2005 | Blicker |
| 2005/0221813 A1 | 10/2005 | Rajahalme et al. |
| 2005/0254453 A1 | 11/2005 | Barneah |
| 2005/0259597 A1 | 11/2005 | Benedetto et al. |
| 2005/0265256 A1 | 12/2005 | Delaney |
| 2006/0003101 A1 | 1/2006 | Yim et al. |
| 2006/0005133 A1 | 1/2006 | Lyle et al. |
| 2006/0013154 A1 | 1/2006 | Choi et al. |
| 2006/0023677 A1 | 2/2006 | Labrador et al. |
| 2006/0031126 A1 | 2/2006 | Ma et al. |
| 2006/0045064 A1 | 3/2006 | Qin et al. |
| 2006/0084444 A1 | 4/2006 | Kossi et al. |
| 2006/0089966 A1 | 4/2006 | Stille et al. |
| 2006/0101266 A1 | 5/2006 | Klassen et al. |
| 2006/0126535 A1 | 6/2006 | Sherman |
| 2006/0128349 A1 | 6/2006 | Yoon |
| 2006/0148516 A1 | 7/2006 | Reddy et al. |
| 2006/0153157 A1 | 7/2006 | Roh et al. |
| 2006/0159079 A1 | 7/2006 | Sachs et al. |
| 2006/0165060 A1 | 7/2006 | Dua |
| 2006/0167784 A1 | 7/2006 | Hoffberg |
| 2006/0227787 A1 | 10/2006 | Furlong et al. |
| 2006/0229098 A1 | 10/2006 | LaBauve et al. |
| 2006/0229101 A1 | 10/2006 | LaBauve et al. |
| 2006/0245530 A1 | 11/2006 | Pradhan et al. |
| 2006/0268716 A1* | 11/2006 | Wijting .......... H04L 47/10 370/235 |
| 2007/0008925 A1 | 1/2007 | Dravida et al. |
| 2007/0015535 A1 | 1/2007 | LaBauve et al. |
| 2007/0019594 A1 | 1/2007 | Perumal et al. |
| 2007/0030973 A1 | 2/2007 | Mikan |
| 2007/0042777 A1 | 2/2007 | Govindarajan et al. |
| 2007/0082671 A1 | 4/2007 | Feng et al. |
| 2007/0087748 A1 | 4/2007 | Du et al. |
| 2007/0087756 A1 | 4/2007 | Hoffberg |
| 2007/0110092 A1 | 5/2007 | Kangude et al. |
| 2007/0155326 A1 | 7/2007 | Lin et al. |
| 2007/0174399 A1 | 7/2007 | Ogle et al. |
| 2007/0180533 A1 | 8/2007 | Ramaiah et al. |
| 2007/0198731 A1 | 8/2007 | Li et al. |
| 2007/0217346 A1 | 9/2007 | Zheng et al. |
| 2007/0223701 A1* | 9/2007 | Emeott .......... H04L 63/065 380/270 |
| 2007/0248066 A1* | 10/2007 | Banerjea .......... H04L 45/26 370/338 |
| 2007/0259716 A1 | 11/2007 | Mattice et al. |
| 2007/0259717 A1 | 11/2007 | Mattice et al. |
| 2007/0263571 A1 | 11/2007 | Hermann et al. |
| 2007/0265088 A1 | 11/2007 | Nakada et al. |
| 2007/0266396 A1 | 11/2007 | Estermann |
| 2007/0270145 A1 | 11/2007 | Feng et al. |
| 2007/0287437 A1 | 12/2007 | Cartmell |
| 2008/0005238 A1 | 1/2008 | Hall et al. |
| 2008/0015024 A1 | 1/2008 | Mullen |
| 2008/0039113 A1 | 2/2008 | Liu et al. |
| 2008/0055269 A1 | 3/2008 | Lemay et al. |
| 2008/0070601 A1 | 3/2008 | Brueckheimer et al. |
| 2008/0080401 A1 | 4/2008 | Ribiere et al. |
| 2008/0096565 A1 | 4/2008 | Jin et al. |
| 2008/0123685 A1 | 5/2008 | Varma et al. |
| 2008/0126484 A1 | 5/2008 | Wherry et al. |
| 2008/0140495 A1 | 6/2008 | Bhamidipaty et al. |
| 2008/0144493 A1 | 6/2008 | Yeh |
| 2008/0148328 A1 | 6/2008 | Runne |
| 2008/0159236 A1 | 7/2008 | Ch'ng et al. |
| 2008/0163355 A1 | 7/2008 | Chu |
| 2008/0168396 A1 | 7/2008 | Matas et al. |
| 2008/0177659 A1 | 7/2008 | Lacey et al. |
| 2008/0186206 A1 | 8/2008 | Reumerman |
| 2008/0186536 A1 | 8/2008 | Shimizu |
| 2008/0192737 A1 | 8/2008 | Miyazaki et al. |
| 2008/0200165 A1 | 8/2008 | Sharma et al. |
| 2008/0218316 A1 | 9/2008 | Marques et al. |
| 2008/0262893 A1 | 10/2008 | Hoffberg |
| 2008/0262928 A1 | 10/2008 | Michaelis |
| 2008/0273677 A1 | 11/2008 | Alfano et al. |
| 2008/0293389 A1 | 11/2008 | Chin et al. |
| 2008/0307322 A1 | 12/2008 | Stochosky et al. |
| 2009/0030605 A1 | 1/2009 | Breed |
| 2009/0037595 A1 | 2/2009 | Breau et al. |
| 2009/0041039 A1 | 2/2009 | Bear et al. |
| 2009/0045977 A1 | 2/2009 | Bai et al. |
| 2009/0046065 A1 | 2/2009 | Liu et al. |
| 2009/0046628 A1 | 2/2009 | Hall |
| 2009/0104874 A1 | 4/2009 | Ellis |
| 2009/0106068 A1 | 4/2009 | Bhamidipaty et al. |
| 2009/0109898 A1 | 4/2009 | Adams et al. |
| 2009/0138353 A1 | 5/2009 | Mendelson |
| 2009/0167499 A1 | 7/2009 | Koo et al. |
| 2009/0175223 A1 | 7/2009 | Hall |
| 2009/0176520 A1 | 7/2009 | B. S. et al. |
| 2009/0180440 A1 | 7/2009 | Sengupta et al. |
| 2009/0195518 A1 | 8/2009 | Mattice et al. |
| 2009/0201860 A1 | 8/2009 | Sherman et al. |
| 2009/0207783 A1 | 8/2009 | Choi et al. |
| 2009/0231189 A1 | 9/2009 | Reddy et al. |
| 2009/0245518 A1 | 10/2009 | Bae et al. |
| 2009/0248420 A1 | 10/2009 | Basir et al. |
| 2009/0254648 A1 | 10/2009 | Childress et al. |
| 2009/0258336 A1 | 10/2009 | Foote |
| 2009/0286531 A1 | 11/2009 | Bhatt et al. |
| 2009/0298461 A1 | 12/2009 | O'Reilly |
| 2009/0303942 A1 | 12/2009 | Camilleri et al. |
| 2009/0323579 A1 | 12/2009 | Bai et al. |
| 2009/0325603 A1 | 12/2009 | Van Os et al. |
| 2010/0002698 A1 | 1/2010 | Clack et al. |
| 2010/0008259 A1 | 1/2010 | Yoon et al. |
| 2010/0029216 A1 | 2/2010 | Jovicic et al. |
| 2010/0029245 A1 | 2/2010 | Wood et al. |
| 2010/0042601 A1 | 2/2010 | Kelley et al. |
| 2010/0042690 A1* | 2/2010 | Wall .......... 709/206 |
| 2010/0060480 A1 | 3/2010 | Bai et al. |
| 2010/0060611 A1 | 3/2010 | Nie |
| 2010/0067451 A1 | 3/2010 | Hall |
| 2010/0069109 A1 | 3/2010 | Hall |
| 2010/0074234 A1 | 3/2010 | Banks et al. |
| 2010/0082513 A1 | 4/2010 | Liu |
| 2010/0115272 A1* | 5/2010 | Batta .......... H04L 45/00 713/162 |
| 2010/0137021 A1* | 6/2010 | Sharret .......... H04W 88/04 455/550.1 |
| 2010/0158097 A1 | 6/2010 | Pascal et al. |
| 2010/0162133 A1 | 6/2010 | Pascal et al. |
| 2010/0162149 A1 | 6/2010 | Sheleheda et al. |
| 2010/0169009 A1 | 7/2010 | Breed et al. |
| 2010/0203878 A1 | 8/2010 | Kim et al. |
| 2010/0214987 A1 | 8/2010 | Mori |
| 2010/0226342 A1 | 9/2010 | Colling et al. |
| 2010/0235285 A1 | 9/2010 | Hoffberg |
| 2010/0235734 A1 | 9/2010 | Ording et al. |
| 2010/0235735 A1 | 9/2010 | Ording et al. |
| 2010/0245124 A1 | 9/2010 | Bai et al. |
| 2010/0296507 A1 | 11/2010 | Masiyowski et al. |
| 2010/0299635 A1 | 11/2010 | Oh et al. |
| 2010/0313128 A1 | 12/2010 | Phillips et al. |
| 2010/0317420 A1 | 12/2010 | Hoffberg |
| 2011/0004513 A1 | 1/2011 | Hoffberg |
| 2011/0019665 A1 | 1/2011 | Le Rouzic et al. |
| 2011/0038350 A1 | 2/2011 | Gholmieh et al. |
| 2011/0055893 A1 | 3/2011 | Walls et al. |
| 2011/0086647 A1 | 4/2011 | Riddle et al. |
| 2011/0087972 A1 | 4/2011 | Swink et al. |
| 2011/0096917 A1 | 4/2011 | Mounir Alaoui et al. |
| 2011/0107228 A1 | 5/2011 | Huang |
| 2011/0111726 A1 | 5/2011 | Kholaif et al. |
| 2011/0173280 A1 | 7/2011 | Ishikawa et al. |
| 2011/0202393 A1 | 8/2011 | DeWakar et al. |
| 2011/0217999 A1 | 9/2011 | Lin |
| 2011/0228914 A1 | 9/2011 | Zourzouvillys et al. |
| 2011/0231560 A1 | 9/2011 | Mahendran et al. |
| 2011/0237217 A1 | 9/2011 | Monks et al. |
| 2011/0249079 A1 | 10/2011 | Santamaria et al. |
| 2011/0261792 A1 | 10/2011 | Oerton et al. |
| 2011/0264812 A1 | 10/2011 | Bergman et al. |

(56) References Cited

U.S. PATENT DOCUMENTS

| | | |
|---|---|---|
| 2011/0289174 A1 | 11/2011 | Malik |
| 2011/0317663 A1 | 12/2011 | Choi et al. |
| 2012/0019609 A1 | 1/2012 | Chang et al. |
| 2012/0023171 A1 | 1/2012 | Redmond |
| 2012/0036443 A1 | 2/2012 | Ohmori et al. |
| 2012/0044169 A1 | 2/2012 | Enami |
| 2012/0045049 A1 | 2/2012 | Yoakum |
| 2012/0052884 A1 | 3/2012 | Bogatin |
| 2012/0066311 A1 | 3/2012 | Wang et al. |
| 2012/0069754 A1 | 3/2012 | Marsh et al. |
| 2012/0087302 A1 | 4/2012 | Chaturvedi et al. |
| 2012/0124137 A1 | 5/2012 | Self |
| 2012/0134287 A1* | 5/2012 | Turunen .................. H04W 4/06 370/252 |
| 2012/0142380 A1 | 6/2012 | Chang |
| 2012/0151571 A1 | 6/2012 | Shatsky |
| 2012/0158542 A1 | 6/2012 | Nahari |
| 2012/0165049 A1 | 6/2012 | Arnold et al. |
| 2012/0176333 A1 | 7/2012 | Kim et al. |
| 2012/0178460 A1 | 7/2012 | Lewis et al. |
| 2012/0192083 A1 | 7/2012 | Eng et al. |
| 2012/0207149 A1 | 8/2012 | Peters, Jr. et al. |
| 2012/0210008 A1 | 8/2012 | Hsieh |
| 2012/0238328 A1 | 9/2012 | Zhang |
| 2012/0253654 A1 | 10/2012 | Sun et al. |
| 2012/0324048 A1 | 12/2012 | Mao et al. |
| 2012/0330696 A1 | 12/2012 | Clark et al. |
| 2013/0003703 A1 | 1/2013 | Todd et al. |
| 2013/0005351 A1 | 1/2013 | Burns et al. |
| 2013/0018975 A1 | 1/2013 | Higgins |
| 2013/0029639 A1 | 1/2013 | Lee et al. |
| 2013/0060862 A1 | 3/2013 | Douillet et al. |
| 2013/0073349 A1 | 3/2013 | Kolling |
| 2013/0080307 A1 | 3/2013 | Hoffberg |
| 2013/0086463 A1 | 4/2013 | Mandal et al. |
| 2013/0114596 A1 | 5/2013 | Clack et al. |
| 2013/0137396 A1 | 5/2013 | Kim |
| 2013/0154957 A1 | 6/2013 | Locker et al. |
| 2013/0157701 A1 | 6/2013 | Riddle et al. |
| 2013/0162539 A1 | 6/2013 | Wang et al. |
| 2013/0171982 A1 | 7/2013 | Barritt et al. |
| 2013/0178217 A1 | 7/2013 | Keevill et al. |
| 2013/0196652 A1 | 8/2013 | Kim et al. |
| 2013/0297387 A1 | 11/2013 | Michael |
| 2013/0312082 A1* | 11/2013 | Izu .................. H04L 9/0891 726/13 |
| 2014/0004882 A1 | 1/2014 | Johnson et al. |
| 2014/0039946 A1 | 2/2014 | Spiker et al. |
| 2014/0084052 A1 | 3/2014 | Wayne et al. |
| 2014/0243000 A1 | 8/2014 | Keevill et al. |

FOREIGN PATENT DOCUMENTS

| | | |
|---|---|---|
| WO | WO2008027750 | 3/2008 |
| WO | WO2012078565 | 6/2012 |
| WO | WO2012116489 | 9/2012 |

OTHER PUBLICATIONS

Certified Wireless Network Professional; "802.11i Authentication and Key Management (AKM)"; brochure, May 2005.

Cam-Winget, Nancy, et al. "IEEE 802.11 i Overview." NIST 802.11 Wireless LAN Security Workshop. 2002.

Chaplin, C., et al. "802.11 i overview, IEEE. 802.11-04/0123r1." Availabe from: http://www.drizzle.com/aboba/IEEE) [Accessed on Feb. 2005] (2005).

Jafri, Aidil Izani, and Yean Li Ho. "ANonce encryption in 802.11 i 4-way handshake protocol." Proceedings of the 7th International Conference on Advances in Mobile Computing and Multimedia. ACM, 2009.

Sithirasenan, Elankayer, Vallipuram Muthukkumarasamy, and Danny Powell. "IEEE 802.11 i wlan security protocol-a software engineer's model." AusCERT'05: Proceedings of the 4th Asia Pacific Information Technology Security Conference. 2005.

Martinovic, Ivan, et al. Introduction of IEEE 802.11 i and Measuring its Security vs. Performance Tradeoff. Technical Report 35106, University of Kaiserslautern, Computer Science, Kaiserslautern, Germany, 2006.

Sakib, AKM Nazmus, Fauzia Yasmeen, and Sa Sir. "Key Agreement and Authentication Protocol for IEEE 802.11." Global Journal of Computer Science and Technology 11.20 (1965).

* cited by examiner

SYSTEM AND METHOD FOR PRIVATE AND POINT-TO-POINT COMMUNICATION BETWEEN COMPUTING DEVICES

CROSS REFERENCE TO RELATED APPLICATION

The present application is a Nonprovisional and claims benefit of priority from U.S. Provisional Patent Application No. 61/784,354, filed Mar. 14, 2013, the entirety of which is expressly incorporated herein by reference.

FIELD OF THE INVENTION

The present disclosure is directed to point-to-point communication between computing devices. More particular, the present disclosure is directed to enabling computing devices such as computers and mobile phones to communicate data packages without necessary reliance on the internet or central cellular infrastructure.

BACKGROUND

People are dependent on our computers and mobile phones today, however the computers and mobile phones are reliant on central infrastructure in the form of the internet and cell towers, respectively to operate. If any kind of scenario arises where that central infrastructure is unavailable or suffering degraded performance, the computers and mobile phones are not able to communicate with other computers and mobile phones.

SUMMARY

A hardware and software bundle that can enable computers and mobile phones to communicate small data packages without relying on the internet or the central cellular network infrastructure.

This may be referred to as user-to-user communications (U2U) or point-to-point (P2P). Computers and mobile phones enable users to send much more than text messages. For example, GPS coordinates, multimedia from the situation, accelerometer and other sensor data can all be sent over a decentralized network, enabling enhanced communication and situation response when the central grid is unavailable.

BRIEF DESCRIPTION OF THE DRAWINGS

The present disclosure will be more readily understood from the detailed description of exemplary embodiments presented below considered in conjunction with the attached drawings, of which.

It is to be understood that the attached drawings are for purposes of illustrating the concepts of the invention.

DETAILED DESCRIPTION

Software and hardware package can be added to users' existing computers and mobile phones and enable them to transmit small data packages (text, GPS coordinates, sensor data, asynchronous voice, multimedia, or any other digital data hereafter referred to as "messages") directly to each other or through a direct connection or mesh network without reliance on external infrastructure.

Figure 1:
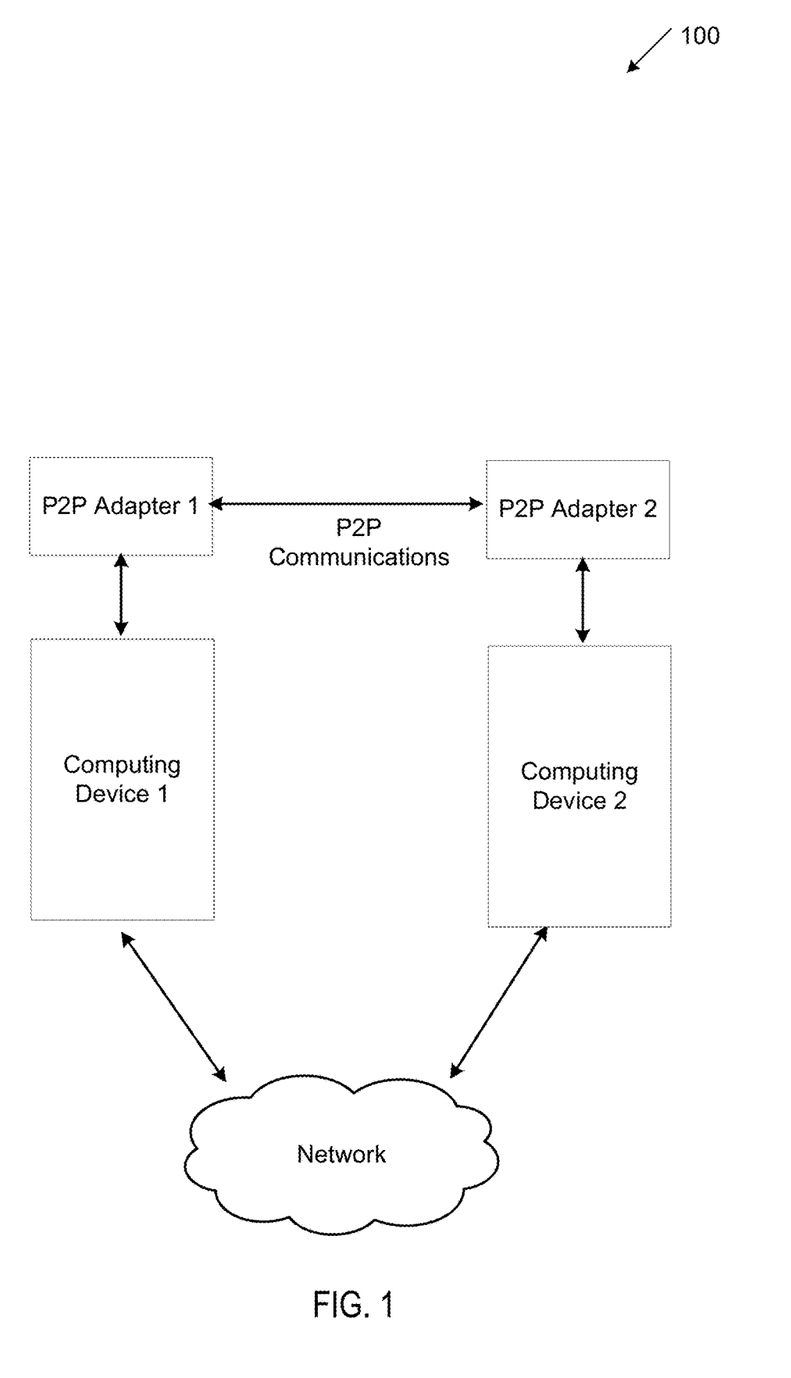
FIG. 1 is an example block diagram of systems for enabling private and point-to-point communication between computing devices in accordance with embodiments of the present invention.

FIG. 1 is an example block diagram of systems for enabling computers and mobile phones to communicate data packages in accordance with embodiments of the present invention. FIG. 1 includes a network, computing devices 1 and 2, and P2P adapters 1 and 2. The network may be a network such as the internet a cellular telephone network, a metropolitan area network (MAN), a Wide area network (WAN), a wireless local area network, a virtual local area network, a common local area network (LAN), personal area network (PAN), campus area network (CAN), or the like. Computing devices 1 and 2 may be a communication endpoint such as a consumer workstation, a server, a computer, a portable electronic device, an entertainment system configured to communicate over a network, such as a set-top box, a digital receiver, a digital television, a mobile phone, or other electronic devices. For example, portable electronic devices may include, but are not limited to, cellular phones, portable gaming systems, portable computing devices, or the like.

The P2P adapters 1 and 2 may include software and hardware packages for enabling private and point-to-point (P2P) communication between computing devices. As used herein, the P2P adapters 1 and 2 may also be referred to as the "device." Also, as used herein, P2P communications refers to a communications connection between two endpoints or computing devices.

As shown in FIG. 1, the computing devices 1 and 2 may communicate with each other via the public network. The P2P adapters 1 and 2 may enable the computing devices 1 and 2 to communicate with each other via P2P or via a private network.

Functional Characteristics for establishing P2P communication between computing devices can include, for example, the following:

1. Send data from one computer or mobile phone to another computer or mobile phone without using the internet or the central cellular infrastructure
2. Establish a system where messages can be sent to specific targeted users
3. Establish manual "channels" where groups of people can chat
4. Operate on unlicensed FCC spectrum
5. Be compatible with leading computers and mobile phones
6. Utilize commodity radio chipsets to create an external digital radio device which can be paired with computers or mobile phones
7. Use existing computer or mobile phone display and input mechanisms
8. Using existing computer or mobile phone processors to power software app
9. Use public/private key encryption to ensure privacy In an example, a device for radio communication can be paired with a computer or mobile phone to leverage the ease of use and power of users' existing computer or mobile phones.

The device can handle sending and receipt of small messages via radio, and can interface with the computer or mobile phone to display and input new messages.

The device can remain active even when not directly communicating with the computer or mobile phone, and can continue to receive and send messages, attempt retries if the recipient is not in range, and forward messages to other participants in the mesh network.

Outline of Device Function:

Sender Software Operations

User composes a new message for transmission to a recipient in their contact list.

Software operations can compress the message into as small a data packet as possible.

Software operations can create the message, comprised of the unencrypted recipient ID and checksum, and encrypted payload (sender ID, timestamp, and message). Devices that receive the message can verify the completeness and accuracy of the transmission, but not read the contents, as the message payload can be encrypted so that only the intended recipient can decrypt it.

Software operations can transmit the message to the device for sending. Transmission to the device may be handled through headphone-jack audio coupling, bluetooth, NFC, USB, custom short-range radio, shared network wifi communication, or other means.

Sender Hardware

A device can receive the message from the computer or mobile phone, and attempt to broadcast it to other nearby devices over unlicensed radio spectrum, and confirm receipt of that message, automatically retrying as appropriate until the recipient is in range and is able to successful return a receipt signal.

Receiver Hardware

The device can listen for new messages via radio, and store incoming messages as appropriate.

Receiving hardware firmware can first check if the target ID matches the ID of the computer or phone it is paired with or another computer or phone in its approved network. If there is no match, the message can be discarded. If matched, the software can continue to next steps.

Hardware can check the checksum to confirm successful receipt of full data package. If not successful, it can continue to gather data packets as the message is retried until the full message is received.

If/when successful checksum is achieved, software can send a small receipt signal with the message ID# in the same way or in a similar way as original messages are sent.

When next paired with the computer or mobile phone, the device can deliver stored messages to the computer or phone for decryption and display.

Receiver Software Operations

When the device's software is opened on the user's computer or mobile phone, it can pair with the device and receive stored messages. It can then decrypt the messages and display them to the user.

The receiver can then choose to respond and this process can repeat in the same manner.

List of Product Implementation Variables

An outline a variety of different ways which could implement different functional pieces of the final device as well as some advanced features planned in our development road-map.

General Form Factor: Description of device implementation.

External dongle: Any kind of device which exists not as an integrated part of a phone or computer, but which still relies on a phone or computer to operate.

Built into phone: Any kind of hardware integrated into a consumer phone or computer which enables User-to-User (U2U) communications in addition to regular computer or cell phone operations Standalone device: A completely independent device that enables U2U communications without reliance on a phone or computer.

Integrated eyeglass display: U2U communications capabilities built into, or working with, an integrated eyeglass display such as Google® Glass.

Functional Pieces

Antenna: This part of the hardware package for the device can be responsible for both the receipt and broadcasting of signals. Working together with the radio chipset, the antenna can be the entry/exit port of signals into spectrum. The antenna may come in a variety of shapes and sizes depending on final form factor as well as the section of spectrum a particular device model might be designed to operate on.

External antenna: An antenna that is not integrated into the computer or phone. It can be a free-standing external hardware piece which can be attached to the computer or phone if the user desires, or it can also operate completely independent of it.

Integrated internal antenna (phone): Antenna that is built directly into a computer or phone. The antenna would live inside the phone not unlike phones' regular 3G, 4G, and other such antennas.

Integrated internal antenna (freestanding device): Not unlike the phone-integrated antenna, however this would be in the case of a full freestanding device being made independent of a computer or mobile phone entirely.

Repurposing existing phone antennas: By accessing the firmware/software on a computer or mobile phone's existing antennas (any of them) and modifying the settings to allow the antennas to broadcast on new frequencies or on the same frequencies but operating in an U2U manner. The existing cellular antenna/radios firmware/software can be modified to allow them to communicate with each other directly over their normal frequencies. This could require updating their programming controls so that the phones did not attempt to connect to a tower, but instead connected to another phone with similar customizations active.

Radio Chipset: This part of the device hardware package can work in tandem with the antenna to prepare signals for broadcast, as well as processing their receipt. The radio chipset's responsibilities include:

Processing between digital and analog signals (to/from)

Setting frequency hopping patterns/protocols

Error-Correction

1. External radio chipset: Independent radio chipset not integrated into a computer or phone or wholly freestanding device, however designed to work in conjunction with a computer or mobile phone to enable U2U communications.

2. Integrated radio chipset: A chipset designed for U2U communications integrated into a computer or mobile phone as an additional chipset.

3. Repurposing existing radio chipsets: Inside a computer or mobile phone accessing the firmware/software to enable any of a computer or phone's existing radio chips to enable U2U communications.

4. Allow the device-enabled chipsets/antennas to broadcast on the same frequencies and protocols (GSM/CDMA/etc) as major cell carriers to become a defacto "Roaming" network which other users could connect to with their regular cell antennas without any device hardware or other customization. This essentially emulates a cell tower which a user can choose to "Roam" onto and then send messages via that connection to that single connection or as part of a larger mesh network.

Broadcasting Protocols

Spectrum: This is the spectrum where the device hardware can be operating. The device can operate on public band spectrum that does not require the user to have a radio operator's license. The spectrum broadcast on can be changed with either a physical add-on/modification to the base device hardware package, or multiple models of the device can be created for varied applications (government, military, wall-penetrating, marine long range, city consumer, etc.—at times different spectrum can be optimal for each consumer type). The protocols and functionality can be similar or identical across all electromagnetic spectrums.

Data interface: Primary processing, data input/display, and security features can be via computer or mobile phone's existing processors and data input/output features (e.g., touch screens, processors, etc). The data to be sent via our radio hardware, or the data received via that same hardware can make it to and from the computer or mobile phone's primary hardware and any device hardware. Methods by which this can be achieved include:

Via the headphone jack: Most mobile phones have Tip-Ring-Ring-Sleeve (TRRS) headphone jacks. These jacks allow for both the output and input of audio signals. The output is the regular contact one uses for audio, but there is also a contact for a microphone which allows data to come back in to the phone. The device can use the data input/output contacts already found with TRRS headphone jacks to transfer data to and from the device hardware. This can require software that can send the appropriate signals to the mobile phone's audio output chip, as well as receive signals back. Once the signals are out, the device hardware can be able to interpret those signals for broadcast (and receipt).

The connection pathway via the headphone jack can be:

Direct wire (line connection) from headphone jack to device hardware.

Proprietary low power radio reading signals from headphone jack and broadcasting it a short range to the device hardware.

Near field communications chip via headphone jack.

Bluetooth® low energy add on via headphone jack.

Bluetooth® add on via headphone jack.

WiFi add on via headphone jack.

Universal Serial Bus (USB) ports: A computer can directly talk to the device hardware via USB. Computers and mobile phones can also communicate via their own micro-USB connector. The connection pathway can be made for any of the variations found for the headphone jack as well originating via the USB ports (direct line, NFC, etc)

Near field communications (NFC): Mobile phones or computers with their own built in NFC chips can be paired with the device and data can be sent and received via that medium.

Apple® iOS ports: Same as USB ports, but using any of the iOS proprietary ports (30-pin, Lightening).

WiFi: Using phone or computer's WiFi to connect with device hardware.

Bluetooth®/Low-Power Bluetooth®: Using a phone/computer's existing Bluetooth chips to communicate with device hardware.

Integrated: For integrated solutions in a phone or standalone device the necessary connections can be on the circuit boards themselves.

Processing: There can be two batches of processing. Some pre-processing can occur on the radio chipset (this has already been covered). However primary processing to decode signals and display/create them for a user requires more advanced processing power. This section refers to that processing.

Mobile phone or computer's built in processing power: Building apps on leading platforms which pair with the device hardware.

Device processors: For a standalone device all processing would have to be handled by device processors that can include these higher level functionalities into it (same goes for user interface).

Mix of both: Certain functions can be split between the device processors and phone/computer processors depending on best use. For example, error-correction could be handled by firmware processing, while decoding of encryption can be done by higher power phone/computer processors.

Error Correction (to extend range we'll deal with imperfect/incomplete signals)

Checksums: Checksums can be sent as an unencrypted part of the total data signal. Firmware can collect the checksums and run the necessary calculations to determine if the message was completed correctly before storing or sending it to the computer or phone for decryption, or rebroadcasting it as part of a mesh network.

Resends: Sender can attempt automatic resends for an appropriate period of time or until a receipt signal for that unique message is received back.

Partial packet reconstruction: If receiver only successfully captures X of Y data packets, it can temporarily save them to see if it can capture some of the missing packets and reconstruct the entire data set.

Privacy: Privacy is one of the primary value propositions of the device. As used herein, privacy means that only intended recipients will be capable of decrypting and accessing the contents of any data package sent via the device.

Public/private key exchange (derivation of PGP): This is an example of a core of the device's privacy system. Each user can be able to create a highly randomized security key based on sensor data from the computer or mobile phone (accelerometer, random screen movement input, etc). Based on this unique key, device's software can create a public/private key pair that can be shared with users they want to speak with privately.

Firmware control: Firmware can discard any messages with a target ID not matching that computer or phone's ID or not matching any group IDs that user may be a part of.

Proprietary Encryption: device may develop proprietary encryption with software controls only allowing the decoding and display of messages with target ID value matching computer or phone's ID (e.g., phone number)

Message decay: Software controls can be implemented that can cause a message to be deleted after X period of time set by sender.

Password access: App may require password/fingerprint/etc to open at all.

Networking: Method of extending the device unit range beyond strict U2U communications.

Mesh networking (store-and-forward): Messages sent by one device user can automatically be rebroadcast by other device users in range for X period of time or until confirmation receipt is sent back by recipient. This takes U2U communication to U2U2U and so forth.

Private mesh networks (e.g., VPN): Users can build private mesh networks where only other members of their group are stored-and-forwarded or are done so with preference over others.

Device rebroadcast points: The device or its customers set up higher power fixed rebroadcast points in strategic points to extend the range of all device units as a high-power general store-and-forward point.

Mobile rebroadcast points: Same function as the fixed rebroadcast points but in a mobile unit.

Power: Methods of powering the device.

Battery: Primary power source.

Emergency secondary battery: Independently toggled power source (not automatic) which can allow a very limited amount of power for broadcast and listening.

Capacitor: A small capacitor can be integrated for small emergency bursts of broadcast or listening. Powering options include:

Solar

Earphone jack

Kinetic (crank)

USB: Device battery can charge off of USB power, and be able to run on it as well.

Proprietary mobile phone ports: Power can be drawn from any proprietary port like the iOS Lightening port.

Wireless induction: Device can be powered through wireless induction from a nearby base station that can be plugged into AC/DC power, computer, solar, or any other original source Fuel cells Power drawn from mobile phone's headphone audio jack.

Basic User Features

One to one chat for discrete users

Group chat

Management of messages sent/received by contacts list in computer or phone

Other Features

GPS coordinates: GPS coordinates could be drawn from phone or computer's GPS receiver and transmitted. The receiving computer or phone could use the coordinates to display sender's location on Google® Maps or in a device proximal display (display showing location relative to own GPS coordinates).

Triangulation: the device unit can be requested to go into active ping mode to allow other units searching for its particular signal to triangulate its position based off of other device unit rebroadcasting. Results could be show in a proximal display (display relative to own position—ie. 50 feet away, North)

Rough pinging: Like triangulation, but for when triangulation is not possible. User being located could still have to enter ping mode, and distance could be based only off of rough measurement of signal strength. Display could only be rough distance without direction.

Emergency mode: All units may have the ability to broadcast with overpower on emergency frequencies as dictated by the FCC Standby E-ink display: Units may include a screen displaying number of messages being held locally by the device hardware while not actively exchanging data with a phone/computer (low power use)

Speech to text interface: Either accomplished via computer or phone software or any other device software such as Google® Glass. Microphone could capture speech, and software package would translate it to text for transmittal.

4D base station triangulation: In locations that require it (emergency mostly), 4 device rebroadcast points could be set up around a building (3 outside on same level, $4^{th}$ elevated above others) to penetrate building walls and display a 4D map of any device units inside and their movements.

Potential Application: track the location of fire fighters inside a building and relay both the positions of other firefighters as well as which areas have already been checked to them back over device devices.

Commercial application: find things in stores or track consumers.

Open API for developers: Self-explanatory. $3^{rd}$ party developers can use the API to develop new uses of the device hardware.

Entry/exit points to the world wide web by either device fixed access points, or by relaying a message to a user which can have an enabled "Internet Entry" option which can allow any device message it receives, which requests for access, to use their data connection (of any type) to enter the wider internet and either process to a device online app, or any other end point (partner apps, re-exit back to the device system, etc).

There can also be "Internet Exit" points which can be either fixed devices, or a user who enables the device to be an exit point. Here the jump is in reverse and a message which entered or originated from the internet hops out onto the device's ad-hoc network to proceed along its path as required.

Figure 2:
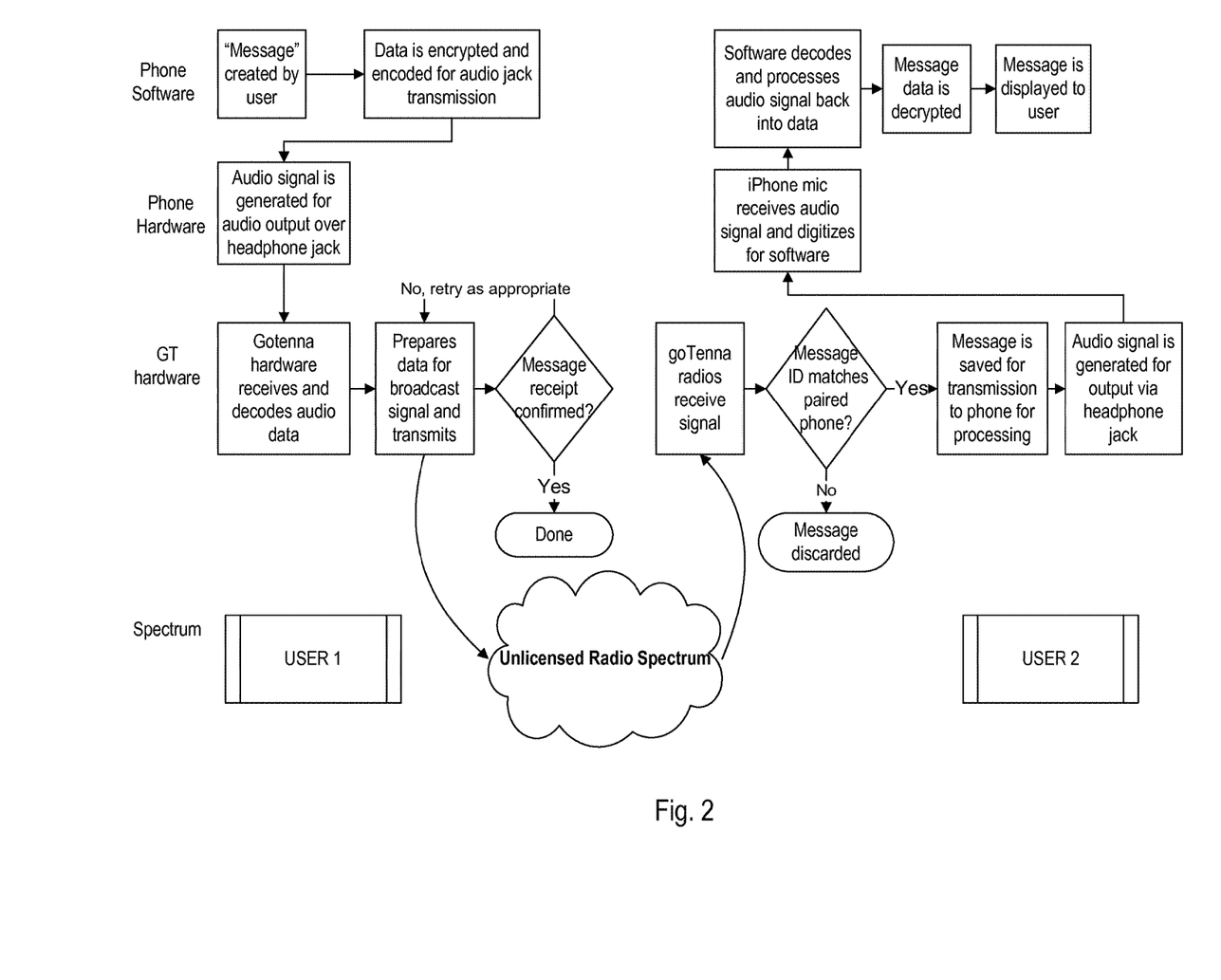
FIG. 2 is a flow diagram of an example method for enabling private and point-to-point communication between computing devices in accordance with embodiments of the present invention.

FIG. 2 is a flow diagram of an example method for enabling private and point-to-point communication between computing devices in accordance with embodiments of the present invention. The method begins with a first user (User 1) who may wish to transmit a message to a second user (User 2). User 1 may use the computing device or phone software to create a message. The data may be encrypted and encoded for transmission by, for example, an audio jack. The computing device or phone hardware may generate an audio signal for audio output over a headphone jack or an output port. The device (i.e., goTenna®) hardware may receive and decode the data (e.g., the audio data), prepare the data for broadcast signal, and may transmit the signal. The transmission may repeat until a message receipt is confirmed.

The message from User 1 to User 2 may be transmitted via the unlicensed radio spectrum. The device hardware of User 2 may receive the radio transmission signal and check if a message ID is paired with the computing device of User 2. If the message ID is not paired with the computing device of User 2, then the message may be discarded. If the message ID is paired with the computing device of User 2, then the message may be saved for transmission to User 2's computing device for processing. The device hardware may generate an audio signal via an input jack of User 2's computing device. User 2's computing device may receive the input signal and digitize the signal for the computing device software for further processing. User 2's computing device software may decode the received signal (e.g., an audio signal) and process the decoded signal into a message data stream. The message data stream may be decrypted and displayed to User 2.

Figure 3:
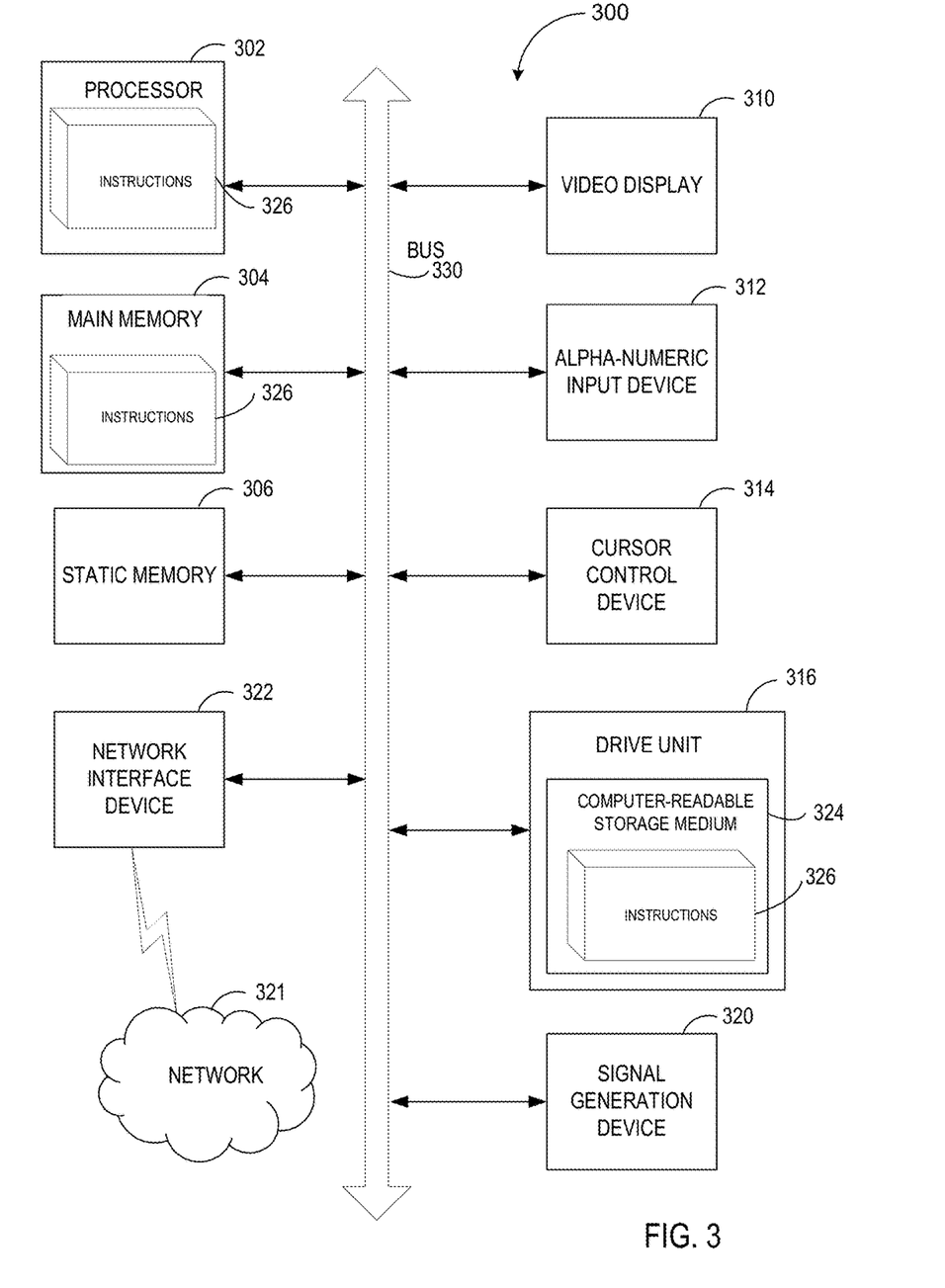
FIG. 3 is a block diagram of an exemplary computer system that may perform one or more of the operations described herein for enabling private and point-to-point communication between computing devices.

FIG. 3 illustrates a diagrammatic representation of a machine in the form of a computer system, in accordance with one example. The computing system may include a set of instructions 326, for causing the machine to perform any one or more of the methodologies discussed herein. In alternative examples, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines (e.g., computers) that individually or jointly execute a set (or multiple sets) of instructions to perform any one or more of the methodologies discussed herein.

The computer system 300 includes a processing device 302, a main memory 304 (e.g., read-only memory (ROM), flash memory, dynamic random access memory (DRAM) such as synchronous DRAM (SDRAM), etc.), a static memory 306 (e.g., flash memory, static random access memory (SRAM), etc.), and a secondary memory 316 (e.g., a data storage device), which communicate with each other via a bus 330.

The processing device 302 represents one or more general-purpose processing devices such as a microprocessor, central processing unit, or the like. More particularly, the processing device 302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 302 may also be one or more special-purpose processing devices such as an application specific integrated circuit (ASIC), a field programmable gate array (FPGA), a digital signal processor (DSP), network processor, or the like. The processing device 302 is configured to execute the operations for private point-to-point communication between computing devices for performing steps discussed herein.

The computer system 300 may further include a network interface device 322. The network interface device may be in communication with a network 321. The computer system 300 also may include a video display unit 310 (e.g., a liquid crystal display (LCD), a touch screen, or a cathode ray tube (CRT)), an alphanumeric input device 312 (e.g., a keyboard), a cursor control device 314 (e.g., a mouse), and a signal generation device 320 (e.g., a speaker).

The secondary memory 316 may include a computer-readable storage medium (or more specifically a non-transitory computer-readable storage medium) 324 on which is stored one or more sets of instructions 326 (e.g., instructions executed by private point-to-point communication between computing devices) for the computer system 300 representing any one or more of the methodologies or functions described herein. The instructions 326 for the computer system 300 may also reside, completely or at least partially, within the main memory 304 and/or within the processing device 302 during execution thereof by the computer system 300, the main memory 304 and the processing device 302 also constituting computer-readable storage media. The instructions 326 for the computer system 300 may further be transmitted or received over a network via the network interface device 322.

While the computer-readable storage medium 324 is shown in an example to be a single medium, the term "computer-readable storage medium" should be taken to include a single medium or multiple media (e.g., a centralized or distributed database, and/or associated caches and servers) that store the one or more sets of instructions 326. The term "computer-readable storage medium" shall also be taken to include any medium that is capable of storing or encoding a set of instructions for execution by the machine that cause the machine to perform any one or more of the methodologies of the disclosure. The term "computer-readable storage medium" shall accordingly be taken to include, but not be limited to, solid-state memories, and optical and magnetic media.

Some portions of the detailed descriptions above are presented in terms of symbolic representations of operations on data bits within a computer memory. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "configuring," "associating," "executing," "adjusting," "sending," "receiving," "determining," "transmitting," "identifying," "specifying," "granting," "accessing," "assigning," "detecting," and "requesting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The descriptions and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. Although the disclosure has been described with reference to specific examples, it will be recognized that the disclosure is not limited to the examples described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A mesh network communication method, comprising:

establishing a wireless radio frequency mesh communication network comprising a plurality of mesh network communication devices, each mesh network communication device having a wireless radio frequency transceiver and being capable of independently assuming a role of at least a sender mesh network communication device, a recipient mesh network communication device, and an intermediate mesh network communication device;

conducting a public key infrastructure (PKI) key exchange associated with each of the sender mesh network communication device and a plurality of recipient mesh network communication devices from the plurality of mesh network communication devices, to define an encryption key and a decryption key for maintaining privacy of communications through the wireless radio frequency mesh communication network between the sender mesh network communication device and the plurality of recipient mesh network communication devices with respect to non-recipient mesh network communication devices;

encrypting a message with the encryption key to produce an encrypted message, and associating the encrypted message with the at least one target identifier that targets the plurality of respective recipient mesh network communication devices;

communicating a plurality of packets of information comprising the encrypted message through the wireless radio frequency mesh communication network, each packet comprising data and at least one of an error detecting code and an error correcting code and comprising at least one target identifier, sent from the sender mesh network communication device, received by at least one intermediate mesh network communication device, stored by the at least one intermediate mesh network communication device, filtered by the at least one intermediate mesh network communication device based on the at least one target identifier, and retransmitted by the at least one intermediate mesh network communication device until receipt by the recipient mesh network device is acknowledged or a predetermined period of time expires;

wherein in at least one mode of a plurality of modes of operation, at least one of the plurality of recipient mesh network communication devices is unavailable to acknowledge receipt of the plurality of packets of information, when the sender mesh network communication device communicates the plurality of packets of information, the at least one intermediate mesh network communication device rebroadcasting at least a portion of the plurality of packets of information for the shorter of a predetermined duration, and a time of receipt of a confirmation message from the at least one recipient mesh network communication device which is unavailable when the sender mesh network communication device communicates;

selectively receiving the plurality of packets of information through the wireless radio frequency mesh communication network, by the plurality of the recipient mesh network communication devices, stored and forwarded from the at least one intermediate mesh network communication device, based on the target identifier; and deleting the plurality of packets of information communicated through the wireless radio frequency mesh communication network after of expiration of the predetermined duration.

2. The method according to claim 1, wherein each respective mesh network communication device is associated with, and selectively communicates with, a cellphone configured to execute a software app, the software app controlling the respective mesh network communication device.

3. The method according to claim 1, wherein each respective mesh network communication device is associated with, and selectively communicates with, a cellphone configured to execute a software app, the software app communicating GPS coordinates to the respective mesh network communication device.

4. The method according to claim 1, wherein each respective mesh network communication device is associated with, and selectively communicates with, a cellphone or portable computer configured to execute a text communication application which selectively transmits and receives text messages through the respective mesh network communication device.

5. The method according to claim 1, wherein at least one of the sender mesh network communication device and the plurality of recipient mesh network communication devices communicate through a cellular communication device with the Internet.

6. The method according to claim 1, wherein each of the sender mesh network communication device and the plurality of recipient mesh network communication devices communicate through a respective cellular communication device with the Internet.

7. The method according to claim 1, wherein said conducting a PKI key exchange comprises conducting the PKI key exchange with the plurality of respective recipient mesh network communication devices.

8. The method according to claim 1, wherein the sender mesh network communication device and the plurality of the recipient mesh network communication devices are each associated with, and selectively communicate with, a cellular communication device, configured to conduct communications over a cellular network infrastructure, wherein the sender mesh network communication device and the plurality of recipient mesh communication devices communicate information between the respective cellular communication devices without accessing the cellular network infrastructure.

9. The method according to claim 1, wherein the sender mesh network communication device is associated with a cellphone having a stored contact list, and wherein the target identifier comprises at least one entry in the stored contact list corresponding to a respective cellphone associated with each of the plurality of recipient mesh network communication devices.

10. The method according to claim 1, wherein each of the plurality of packets comprising the encrypted message comprises a sender identification, a recipient identification, a checksum, a portion of the encrypted message, and a timestamp.

11. The method according to claim 1, further comprising communicating information comprising at least one of the received encrypted message, and a decrypted received encrypted message through at least one of a headphone jack, Bluetooth, near field communications (NFC), universal serial bus (USB) communications, and WiFi.

12. The method according to claim 1, further comprising:
comparing the target identifier with a predetermined target identifier of each respective mesh network communication device that receives the encrypted message,
selectively in dependence on a match of the target identifier associated with the encrypted message and the predetermined target identifier, sending an acknowledgement, and
selectively in dependence on a mismatch of the target identifier associated with the encrypted message and the predetermined target identifier, storing and forwarding at least one of the plurality of packets comprising the encrypted message.

13. The method according to claim 1, wherein at least one of the plurality of recipient mesh network communication devices comprises a display and a microprocessor, further comprising processing the received encrypted message with the microprocessor and selectively controlling the display in dependence on the received encrypted message.

14. The method according to claim 1, wherein the at least one intermediate mesh network communication device automatically determines whether it has successfully received all of the plurality of packets comprising the encrypted message, and if not, storing the packets it has successfully received and monitoring communications of the wireless radio frequency mesh communication network for missing packets which were not successfully received.

15. The method according to claim 1, further comprising prioritizing the forwarding of the encrypted message selectively based on a relationship of at least one recipient mesh network communication device to the respective intermediate mesh network communication device that stores the encrypted message.

16. The method according to claim 1, further comprising triangulating a position of a respective mesh network communication device.

17. A mesh network communication method, comprising:
establishing a wireless radio frequency mesh communication network comprising a plurality of mesh network communication devices, each mesh network communication device having a wireless radio frequency transceiver and being capable of independently assuming a role of at least a sender mesh network communication device, a recipient mesh network communication device, and an intermediate mesh network communication device;
conducting a public key infrastructure (PKI) key exchange associated with each of the sender mesh network communication device and a plurality of recipient mesh network communication devices from the plurality of mesh network communication devices, to define an encryption key and a decryption key for maintaining privacy of communications through the wireless radio frequency mesh communication network between the sender mesh network communication device and the plurality of recipient mesh network communication devices with respect to non-recipient mesh network communication devices;
encrypting a message with the encryption key to produce an encrypted message, and associating the encrypted message with the at least one target identifier that targets the plurality of respective recipient mesh network communication devices and a timecode;
communicating a plurality of packets of information comprising the encrypted message through the wireless radio frequency mesh communication network, each packet comprising data and at least one of an error detecting code and an error correcting code and comprising at least one target identifier, sent from the sender mesh network communication device, received by at least one intermediate mesh network communication device, stored by the at least one intermediate mesh network communication device, filtered by the at least one intermediate mesh network communication device based on the at least one target identifier, and retransmitted by the at least one intermediate mesh network communication device until receipt by the recipient mesh network device is acknowledged or a predetermined period of time expires;
wherein at least one of the plurality of recipient mesh network communication devices is unavailable to acknowledge receipt of the plurality of packets of information, when the sender mesh network communication device communicates the plurality of packets of information, the at least one intermediate mesh network communication device periodically rebroadcasts at least a portion of the plurality of packets of information for the shorter of a predetermined duration, and a time of receipt of a confirmation message from the at least one recipient mesh network communication device which is unavailable when the sender mesh network communication device communicates;
selectively receiving the plurality of packets of information through the wireless radio frequency mesh communication network, by the plurality of the recipient mesh network communication devices, stored and forwarded from the at least one intermediate mesh network communication device, based on the target identifier; and
deleting the plurality of packets of information communicated through the wireless radio frequency mesh communication network after expiration of the predetermined duration with respect to the timecode in the received plurality of packets of information.

18. A mesh network communication device, for communicating in a wireless radio frequency mesh communication network, comprising:
a wireless radio frequency transceiver and microprocessor, configured to independently assume a role of at least a sender mesh network device, a recipient mesh network device, and an intermediate mesh network device, comprising:
at least one automated processor, configured to:
conduct a public key infrastructure (PKI) key exchange with a plurality of other mesh network communication devices, to define an encryption key and a decryption key for maintaining privacy of communications through the wireless radio frequency mesh communication network;
control the wireless radio frequency transceiver to communicate a first plurality of packets of information comprising a first encrypted message, encrypted according to the encryption key to produce an encrypted message, associated with at least a first target identifier that targets a plurality of recipient mesh network devices, and a first timecode, each packet comprising data and at least one of an error detecting code and an error correcting code, through the wireless radio frequency mesh communication network;

control the wireless radio frequency transceiver to receive a second plurality of packets of information comprising a second encrypted message, associated with at least a second target identifier, and a second timecode, and determine whether the second target identifier corresponds to a respective target identifier of the mesh network communication device; and if the second target identifier does not correspond with the respective target identifier of the mesh network communication device, storing and forwarding the second plurality of packets comprising the second encrypted message, wherein in at least one mode of operation, at least one mesh network communication device targeted by the second target identifier is unavailable to confirm receipt of the second plurality of packets, the mesh network device being configured to rebroadcast the second plurality of packets comprising the second encrypted message for the shorter of a predetermined duration and receipt of a confirmation message from the at least one mesh network communication device targeted by the second target identifier, and then delete the second plurality of packets comprising the second encrypted message.

19. The mesh network communication device according to claim 18, wherein the PKI key exchange comprises a PKI key exchange conducted with the plurality of respective recipient mesh network communication devices.

* * * * *